Feb. 14, 1956 — J. R. HOTCHKIN — 2,734,547
SHEET METAL LOCK NUT WITH RESILIENT CONICAL FLANGE
Filed June 19, 1948

Inventor
JAMES ROWLAND HOTCHKIN
By
Ramsey, Chisholm + Hilder
Attorneys

United States Patent Office 2,734,547
Patented Feb. 14, 1956

2,734,547

SHEET METAL LOCK NUT WITH RESILIENT CONICAL FLANGE

James Rowland Hotchkin, Short Hills, N. J., assignor to The Palnut Company, Irvington, N. J., a corporation of New Jersey Application June 19, 1948, Serial No. 33,995

1 Claim. (Cl. 151—38)

This invention relates to a nut-and-bolt organization and to a sheet metal nut which is adapted to be incorporated into the same.

Self-locking sheet metal nuts of various forms are well-known. They are quite generally provided with means which engage the bolt threads and which take a gripping hold thereon when the nut is screwed home, this gripping action being induced by distortion or flexure incident to the tightening of the nut. The strength of the thread-engaging means being limited, the prior art nuts of this type have been subject to damage or failure when tightened with a power wrench. Also, for some uses the holding power of these nuts against counter-rotation has not been as high as is desirable. Additionally, for certain uses washers have been required beneath the nut to cover large holes which are sometimes provided in the work piece to facilitate assembly of the work piece with other parts of an assembly, e. g. other parts of an automobile body.

An object of the present invention is to provide a self-locking sheet metal nut having enhanced tolerance and safety factor in connection with application by a power wrench.

Another object of the invention is to provide a self-locking sheet metal nut having increased holding power against counter-rotation.

An additional object of the invention is to provide an improved and inexpensive nut-and-bolt organization in which the work piece is resiliently clamped, so that clamping pressure will be maintained despite a measure of wear or shrinkage in the parts secured by the nut and bolt.

Further objects of the invention are to provide a one-piece sheet metal nut having a portion which serves in a dual capacity, viz as a washer and as a locking means to hold the nut against counter-rotation, and to provide such a nut which will not scratch or appreciably mar the finish on a work piece.

Still further objects of the invention are to provide a self-locking nut having primary and secondary locking means which cooperate to hold the nut against counter-rotation, and to provide such a nut made in one piece of sheet metal.

Further objects and objects relating to details and economies of manufacture and use will more definitely appear from the detailed description to follow.

My invention is clearly defined in the claim. In both the description and the claim portions of the nut are, for clarity and convenience, usually referred to on the basis of the oriented position of the nut shown in the accompanying drawing. However, no limitation as to the position of the nut is to be implied since it will be apparent that the nut can be used in assemblies which place the nut in any position. Also, in both the description and the claim parts may at times be referred to by specific names for clarity and convenience, but such nomenclature is to be understood as having the broadest meaning consistent with the context and with the concept of my invention as distinguished from the pertinent prior art.

The best form in which I have contemplated applying my invention is illustrated in the accompanying drawing forming part of this specification, in which.

Figure 1:
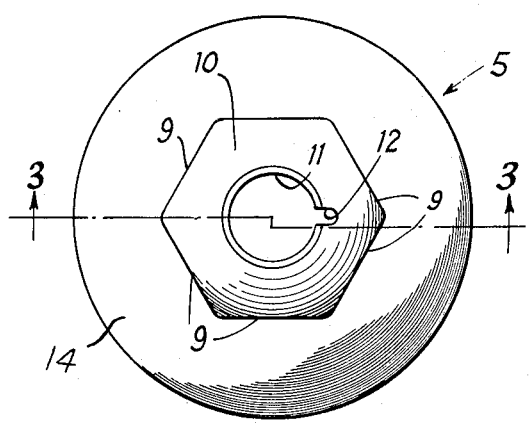
Fig. 1 is a plan view of a first form of nut embodying the present invention.

The nuts 5 and 6 shown are each a one-piece stamping of springy sheet metal, preferably spring steel which is hardened and tempered after the nut has been formed.

Reference will now be had to Figs. 1 through 4. The nut has an upstanding body portion 7, which is of annular form and which is continuous. This body portion is formed with a series of wrench faces 9 (six shown) which are adapted to receive a wrench for screwing the nut home or for loosening the same. Extending inwardly from the top of the body 7 is an upwardly-domed web 10, which is provided with a central bolt-receiving hole 11, the margin of the hole being distorted into helical form in correspondence with a single convolution of the bolt thread with which the nut is to mate. A radially-extending entrance notch for the thread of the bolt is provided at 12. The metal about the hole 11 is so shaped, in conventional manner, as to constitute a self-locking thread engager which, through distortion induced by tightening of the nut, grips the thread of the bolt. The portions of the nut described in this paragraph are of well-known conventional form.

Extending outwardly and downwardly from the bottom of the body 7 is a circumferentially-continuous conical rim 14 of small slope. I have found that for most purposes a satisfactory slope is one of about 10°, i. e. the conical surface making an angle of about 10° to a plane perpendicular to the axis of the bolt. The conical rim has a smooth, unbroken surface, particularly on the bottom; and the outer edge of the rim is a circle concentric with the thread axis of the nut, which axis coincides with the thread axis of the bolt on which the nut is placed.

Figure 3:
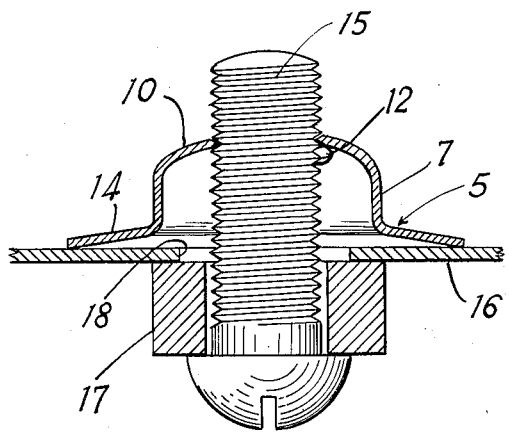
Fig. 3 is a vertical section showing a nut-and-bolt organization embodying the nut shown in Fig. 1, the nut being finger tight and the section of the nut being on the line 3—3 of Fig. 1.
Figure 4:
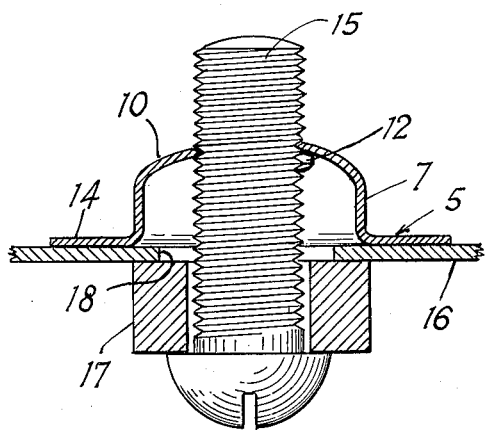
Fig. 4 is a view similar to Fig. 3 but showing the nut screwed home.
Figure 2:
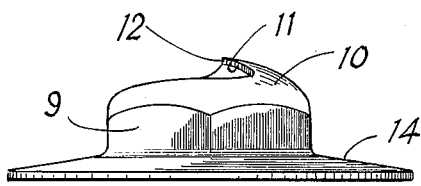
Fig. 2 is an elevation of the nut shown in Fig. 1, viewed from the left side of Fig. 1.

Fig. 3 shows the nut 5 screwed finger tight on a bolt 15 preparatory to clamping a work piece 16 to a support 17. The support 17 may be a bar-like member extending rearwardly as viewed in Fig. 3, and the work piece 16 may be an automobile fender or other sheet metal part of an automobile body. To provide for speedy assembly despite inaccurately located supports or bolt holes, sheet metal body parts such as 16 are often provided with a hole 18 which is much oversize as compared to the diameter of bolt 15. The nut rim 14, however, extends well onto the metal of the work piece 16, so that the nut 5 completely covers the space between the bolt 15 and the periphery of hole 18. Furthermore, the smooth, circular form of rim 14 is advantageous in that it bears smoothly and uniformly against the surface of the work piece 16, thereby permitting the nut to be screwed firmly home without marring or scratching the paint or other finish on the work piece. Additionally, the smooth form of the rim 14, coupled with its circumferential continuity, provides a rim which makes a substantially water-tight seal with the work piece 16 when the nut has been screwed home as shown in Fig. 4. In many instances, this is important as the body construction may be such that rusty water entrained within certain parts of the automobile body would, in the absence of this seal, drain through hole 18 and stain the finish of the car.

Figure 5:
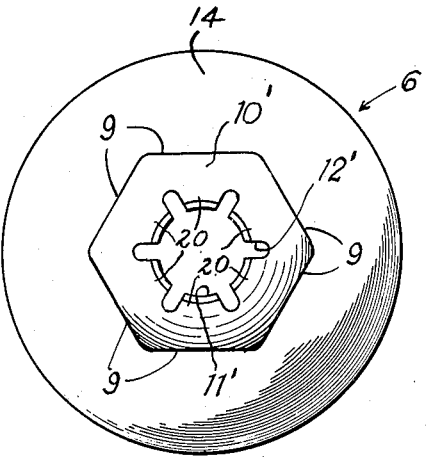
Fig. 5 is a plan view showing a second form of nut embodying the present invention.

The nut 6 shown in Fig. 5 is identical with that shown in Figs. 1 through 4 except that its domed top web 10' is provided with a bolt hole 11', the boundary of which is formed as a multifinger thread engager. As shown, there are six fingers 20 which are helically disposed in correspondence with the bolt thread with which the nut is to be used. The form of top web 10', together with the bolt hole 11' and the multifinger thread engager is conventional in the art, there being one notch 12' through which the male thread enters. When the nut of Figs. 1 through 4 is screwed home, the top web 10 flattens somewhat, causing the thread engager to grip the thread of the bolt. When the nut of Fig. 5 is screwed home, the individual fingers 20 are flexed downwardly, and each finger reacts in toggle fashion with the diametrically-opposite finger to grip the root of the bolt thread.

The circular form of rim 14, together with the relatively small slope of its conical formation, gives a spring which will sustain a heavy load axially of the thread and at the same time afford a substantial degree of resilient yielding axially of the nut. As the nut is screwed home, the outer edge of rim 14 first contacts the work piece 16 and then, as the rim yields, the zone of contact increases in an inward direction to the condition shown in Fig. 4. The outer edge of rim 14 being circular and concentric with the thread axis, all parts of the surface of the work piece 16 that are contacted while the nut is being tightened, lie underneath the rim after the nut has been screwed home.

As the nut is being tightened, the rim 14 acts as a brake, which provides large tolerance and leeway protecting the nut from injury when applied by a power wrench. The frictional contact between the rim 14 and the work piece 16 being at a relatively large radius from the thread axis, provides an effective hold or lock against counter-rotation of the nut. It will be apparent, therefore, that in addition to the primary lock between web 10 or 10' and the bolt thread, this nut provides an effective secondary lock at the outer edge of rim 14.

As a free-turning, solid nut with a tapped thread is screwed home, it goes from finger tight to wrench tight in about ⅛ of a turn. As a free-turning, conventional sheet metal nut having a thread engager such as provided by web 10 or 10' is screwed home, it goes from finger tight to wrench tight in about ¼ to ½ turn. As a free-turning nut of the present invention is screwed home, it goes from finger tight to wrench tight in about 1 full turn. It will be apparent, therefore, that the rim 14 yields considerably during the tightening operation and this rim being springy, the nut resiliently clamps the work piece. Thus, after the nut has been applied, its clamping force will be maintained despite a measure of wear or shrinkage of the parts secured by the nut and bolt.

Nuts of the present invention are satisfactory for one use or another with a rim which extends radially outward from the wrench faces of the nut for a distance varying between four and ten times the thickness of the metal of which the nut is made. For general use, a distance of approximately seven times the thickness of the metal seems to be about right.

I claim:

A one-piece lock nut of springy sheet steel, hardened and tempered; said nut comprising: an upstanding annular body portion of hexagonal form providing six wrench faces; an upwardly-domed web extending inwardly from the top of the body portion, the web being provided with a centrally-located bolt-receiving hole and the sheet metal around the hole being formed as a self-locking thread engager; and a circumferentially-continuous conical rim extending outwardly and downwardly from the bottom of the body portion, the rim being homogeneous with the body portion and having a smooth unbroken bottom surface and a circular outer edge, the rim extending outwardly from the wrench faces for a distance equal to about seven times the thickness of the sheet steel of which the nut is made and the downward inclination of the rim being about 10°, and the rim being sufficiently yieldable in an axial direction to spread out flat when the nut is screwed home against a work piece by torque which is less than that which would cause overloading of the sheet metal thread engager, and the rim being sufficiently springy to exert resilient holding pressure opposing loosening of the nut.

References Cited in the file of this patent

UNITED STATES PATENTS

| | | |
|---|---|---|
| Re. 19,492 | Winchester et al. | Mar. 5, 1935 |
| 1,320,259 | Martens | Oct. 28, 1919 |
| 1,875,930 | Martin | Sept. 6, 1932 |
| 2,226,491 | Gustafson | Dec. 24, 1940 |
| 2,266,049 | Kost | Dec. 16, 1941 |
| 2,284,081 | Beggs | May 26, 1942 |
| 2,347,852 | Thompson | May 2, 1944 |

FOREIGN PATENTS

| | | |
|---|---|---|
| 721,806 | France | Mar. 8, 1932 |
| 903,928 | France | Oct. 22, 1945 |